(12) United States Patent
Takeda

(10) Patent No.: US 6,346,796 B1
(45) Date of Patent: Feb. 12, 2002

(54) THERMAL SHUT-OFF DEVICE AND BATTERY PACK

(75) Inventor: Hideaki Takeda, Misato (JP)

(73) Assignee: Uchiya Thermostat Co., Ltd., Saitama-ken (JP)

( * ) Notice: Subject to any disclaimer, the term of this patent is extended or adjusted under 35 U.S.C. 154(b) by 0 days.

(21) Appl. No.: 09/599,875

(22) Filed: Jun. 23, 2000

(30) Foreign Application Priority Data

Jun. 25, 1999 (JP) .......................................... 11-179969

(51) Int. Cl.[7] .............................. H02J 7/04; H02H 5/04; H01M 14/00; H01H 7/06
(52) U.S. Cl. .......................... 320/154; 361/105; 429/7; 337/79
(58) Field of Search ....................... 320/154; 361/105; 429/7; 337/79

(56) References Cited

U.S. PATENT DOCUMENTS 3,840,834 A * 10/1974 Obenhaus et al. ............ 337/79
4,544,876 A * 10/1985 Bailey et al. ................ 323/282
5,023,744 A *  6/1991 Hofsass ....................... 361/26
5,039,843 A *  8/1991 Muller
5,689,173 A * 11/1997 Oosaki et al. .................. 429/7
5,804,798 A    9/1998 Takeda

FOREIGN PATENT DOCUMENTS

JP          A7153499     *  6/1995
JP          11041823 A      2/1999

* cited by examiner

Primary Examiner—Peter S. Wong
Assistant Examiner—Gregory J. Toatley, Jr.
(74) Attorney, Agent, or Firm—Birch, Stewart, Kolasch & Birch, LLP

(57) ABSTRACT

Contacts 3, 6, which are opened/closed by the displacement of a heat responsive element 7, are interposed between first and second terminals 2, 9, and a heat generating resistor 8 is interposed between the first terminal 9 and a third terminal 10, whereby the heat responsive element 7 is displaced by heat generated when a current is caused to flow in the heat generating resistor 8 via the third terminal 10.

16 Claims, 5 Drawing Sheets

THERMAL SHUT-OFF DEVICE AND BATTERY PACK

FIELD OF THE INVENTION AND RELATED ART

The present invention relates to a thermal shut-off device used suitably for a secondary battery pack and a battery pack using the thermal shut-off device.

FIG. 9 shows a battery pack proposed by Japanese Patent Provisional Publication No. 7-153499. This battery pack incorporates a safety device a having a configuration in which a bimetallic switch b, a resistor c connected in parallel to the bimetallic switch b, and a resistor d connected in series to the bimetallic switch b are incorporated in a casing, not shown.

In this battery pack, if an excessive charging current flows in through a charging terminal e, Joule heat is generated in the resistor d, so that the bimetallic switch b is turned off to stop the charging to an incorporated battery f. If the bimetallic switch b is turned off, the off state of the bimetallic switch b is maintained by the heat generated in the resistors c and d.

FIGS. 10 and 11 show safety shut-off devices proposed by Japanese Patent Provisional Publication No. 63-503020. The shut-off device shown in FIG. 10 has a configuration in which a resistor i is connected in parallel to a bimetallic switch h connected in series to a load g, and a resistor k is interposed between a common connection point between the load g and the bimetallic switch h and the switch j.

In this device, if the switch j is closed, Joule heat is generated in the resistor k to turn off the bimetallic switch h, so that the current carried to the load g is interrupted. If the bimetallic switch h is turned off, the off state of the bimetallic switch h is maintained by the heat generated in the resistors i and k.

The shut-off device shown in FIG. 11 has a configuration in which resistors m and n connected in series to one another are connected in parallel to the bimetallic switch h, and the switch j is connected to a common connection point of the resistors m and n.

In this device, if the switch j is closed, Joule heat is generated in the resistors m and n to turn off the bimetallic switch h, with the result that the current carried to the load g is interrupted. If the bimetallic switch h is turned off, the off state of the bimetallic switch h is maintained by the heat generated in the resistor m.

The safety device shown in FIG. 9 has following problems.

(1) In order to maintain the off state of the bimetallic switch b by means of the heat generated in the resistor c, the impedance of the battery f, which is a load, must be low. This means that when the battery f is short-circuited externally, the on state is maintained. In the recent condition in which a battery pack is used, a secondary battery pack is scarcely removed from equipment such as a computer, so that the external short circuit of the battery occurs in fewer cases. Therefore, the function as a safety device is greatly limited.

(2) In recent years, a battery that requires exact charging/discharging control, such as a lithium battery, has been used frequently for a second battery pack. In the case of such a battery, overvoltage and overheating due to overcharging create a danger, so that multiple safety measures are taken against these phenomena.

As one example, both a safety device using a bimetallic switch and a temperature fuse are used for a protective control circuit. However, since the function of the safety device is greatly limited as described in the above item (1), the temperature fuse finally performs the shutting-off operation.

However, the temperature fuse cannot be reused once it performs the shutting-off operation. Therefore, even if the temperature fuse is operated by misuse, the expensive battery pack becomes incapable of being used.

(3) Since the resistor c is connected in parallel to the bimetallic switch b, complete electrical shutoff is not effected even if the bimetallic switch b is turned off. Therefore, after the bimetallic switch b is turned off, a phenomenon takes place in which a current flows into the battery f from a charger, not shown, connected to the charging terminal e or inversely a current leaks from the battery f to the equipment. This phenomenon is undesirable in terms of safety.

On the other hand, the shut-off device shown in FIG. 10 is configured so that the resistor i is connected in parallel to the bimetallic switch h, and the shut-off device shown in FIG. 11 is configured so that a series composite resistor consisting of the resistors m and n is connected in parallel to the bimetallic switch h.

Therefore, in these shut-off devices, complete electrical shutoff is not effected even if the bimetallic switch h is turned off, so that a current flows to the load g even after the bimetallic switch h has been turned off. That is to say, these shut-off devices pose the same problem as those described in the above item (3).

OBJECTS AND SUMMARY OF THE INVENTION

The present invention has been made in view of the above situation. Accordingly, an object of the present invention is to provide a thermal shut-off device capable of shutting-off operation under various abnormal conditions such as overcurrent, overvoltage, etc., maintenance of a shut-off state, reuse after an abnormality is eliminated, and complete electrical shutoff.

Another object of the present invention is to provide a battery pack using the above-described thermal shut-off device.

To achieve the above object, the present invention provides a thermal shut-off device comprising contacts interposed between first and second terminals, the contacts being opened/closed by the displacement of a heat responsive element, and a heat generating resistor interposed between the first terminal and a third terminal, wherein the heat responsive element is displaced by heat generated when a current is caused to flow in the heat generating resistor via the third terminal.

In the thermal shut-off device, a PTC element can be used as the heat generating resistor.

Also, the heat generating resistor can be formed into a film form, and the film-form resistor can be disposed so as to be in contact with the heat responsive element.

This thermal shut-off device achieves the following effects.

(1) Since a shutting-off operation can be performed based on various pieces of information and the shut-off state can be maintained by using one heat generating resistor, the device can be made small in size and low in cost, and the application range thereof can be broadened.

(2) Since no resistor is connected in parallel to the contacts to be opened/closed, a reliable electrical shut-off property can be provided. Therefore, the reliability as a protector is improved.

Also, the present invention provides a battery pack incorporating a thermal shut-off device comprising contacts interposed between first and second terminals, the contacts being opened/closed by the displacement of a heat responsive element, and a heat generating resistor interposed between the first terminal and a third terminal; and a chargeable battery, wherein the first terminal of the thermal shut-off device is connected to a first terminal for external connection, the second terminal thereof is connected to a second terminal for external connection via the battery, and the third terminal thereof is connected to a third terminal for external connection; and a current is caused to flow in the heat generating resistor via the third terminal for external connection, whereby the contacts are opened by the displacement of the heat responsive element caused by the heat generated by the heat generating resistor.

This battery pack achieves the following effects.

(3) An opening/closing operation of the thermal shut-off device can be performed and the open state can be maintained by an operation from a charger or external equipment such as a computer. Therefore, not only a protective operation against short circuit etc. but also a variety of protective operations based on various pieces of information can be performed.

(4) Since electrical shutoff can be effected reliably, the inflow and outflow of a current into and out of the battery during the time when the shutoff is continued is prevented. As a result, safety is improved.

(5) The battery pack has an economical advantage that it can be reused by disconnecting a heat generating power source.

Further, the present invention provides a battery pack incorporating a thermal shut-off device comprising contacts interposed between first and second terminals, the contacts being opened/closed by the displacement of a heat responsive element, and a heat generating resistor interposed between the first terminal and a third terminal; a chargeable battery; and abnormality detecting means for detecting the condition of the battery to close a switch element if the condition is abnormal, wherein the second terminal of the thermal shut-off device is connected to a first terminal for external connection, the first terminal thereof is connected to a second terminal for external connection via the battery, and the third terminal thereof is connected to the switch element; and a current from the battery is caused to flow to the heat generating resistor by closing the switch element, whereby the contacts are opened by the displacement of the heat responsive element caused by the heat generated by the heat generating resistor.

In this battery pack, abnormality detecting means can detect the condition of the battery based on the current of the battery.

Also, the abnormality detecting means can detect the condition of the battery based on the voltage of the battery.

Further, the abnormality detecting means can detect the condition of the battery based on the temperature of the battery.

This battery pack achieves the following effects in addition to the effect described in the above item (4).

(6) Since the shut-off state of the thermal shut-off device is maintained by the heat generation of the resistor caused by the discharge current of the battery, the thermal shut-off device automatically returns to the closed state when the discharge current of the battery decreases down to a predetermined value. Therefore, a returning operation of the thermal shut-off device is needed.

(7) A variety of protective operations can be performed, and also the battery pack can be reused.

DETAILED DESCRIPTION OF THE PREFERRED EMBODIMENTS

Figure 1:
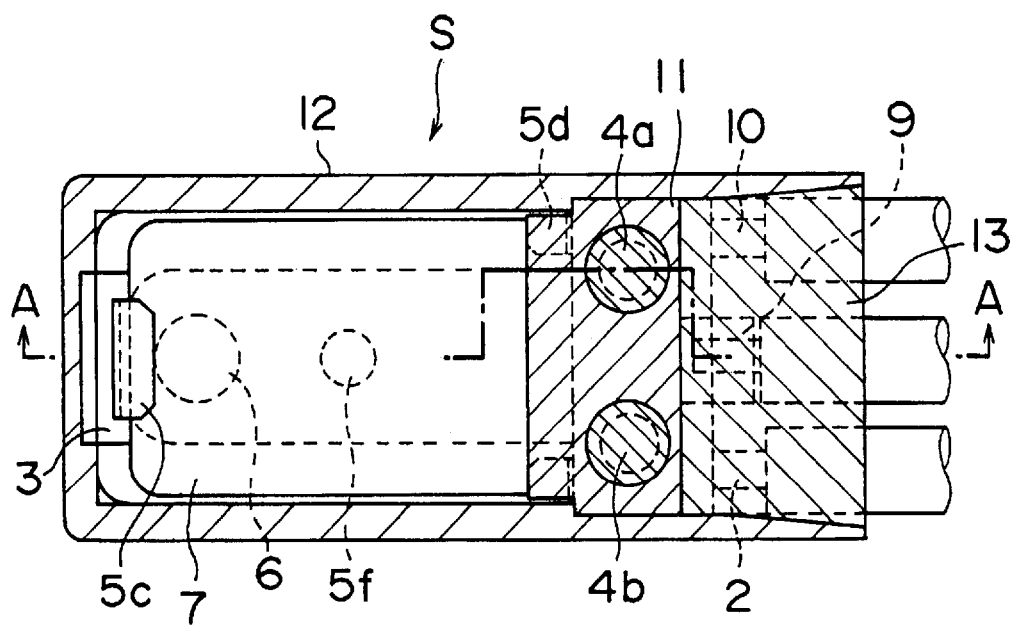
FIG. 1 is a sectional view taken along the line B—B of FIG. 2, showing one embodiment of a thermal shut-off device in accordance with the present invention.
Figure 2:
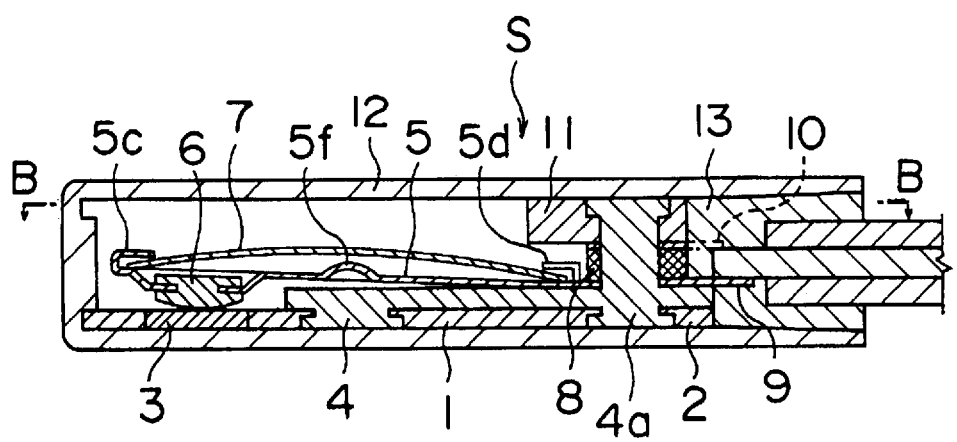
FIG. 2 is a sectional view taken along the line A—A of FIG. 1.

In FIGS. 1 and 2, a fixed plate 1 formed of a conductive material is formed with a terminal 2 at the rear end portion thereof and is formed with a fixed contact 3 at the front end portion thereof. On the fixed plate 1 is fixed an insulating plate 4. The insulating plate 4 has two columnar protrusions 4a and 4b at the rear part thereof, and the columnar protrusions 4a and 4b penetrate holes formed in a movable plate 5, a resistor 8, a terminal 9, etc., described later.

The movable plate 5 formed of a metal plate having elasticity is disposed on the insulating plate 4. The movable plate 5 is supported by fitting the rear part thereof onto the columnar protrusions 4a and 4b of the insulating plate 4. At the front and rear end portions of the movable plate 5 are formed with a movable contact 6 opposed to the fixed contact 3 and a terminal 9, respectively.

A bimetal 7, which is a heat responsive element, is placed on the upper face of the movable plate 5. This bimetal 7 is supported on the movable plate 5 by being fitted with play into claws 5c and 5d provided at both ends of the movable plate 5.

The bimetal 7 performs reversing operation to deform the movable plate 5 when the temperature reaches a predetermined value. This deformation of the movable plate 5 separates the movable contact 6 from the fixed contact 2. To make the deformation of the movable plate 5 caused by the reversing operation of the bimetal 7 as large as possible, a circular protrusion 5f is provided at the central portion of the movable plate 5.

A resistor 8 fitted onto the columnar protrusions 4a and 4b is disposed above the rear part of the movable plate 5, and the terminal 10 fitted onto the columnar protrusions 4a and 4b is disposed on the upper face of the resistor 8. Therefore, one end of the resistor 8 is electrically connected to the upper face of the rear part of the movable plate 5, and the other end thereof is electrically connected to the lower face of the terminal 10.

An insulating plate 11 having electrical insulation properties is disposed on the upper face of the terminal 10. The columnar protrusions 4a and 4b are fused or bonded to the upper face of the insulating plate 11 after penetrating the insulating plate 11.

The components thus assembled are inserted in a housing 12, and the opening of the housing 12 is sealed by resin 13 or the like.

Figure 3:
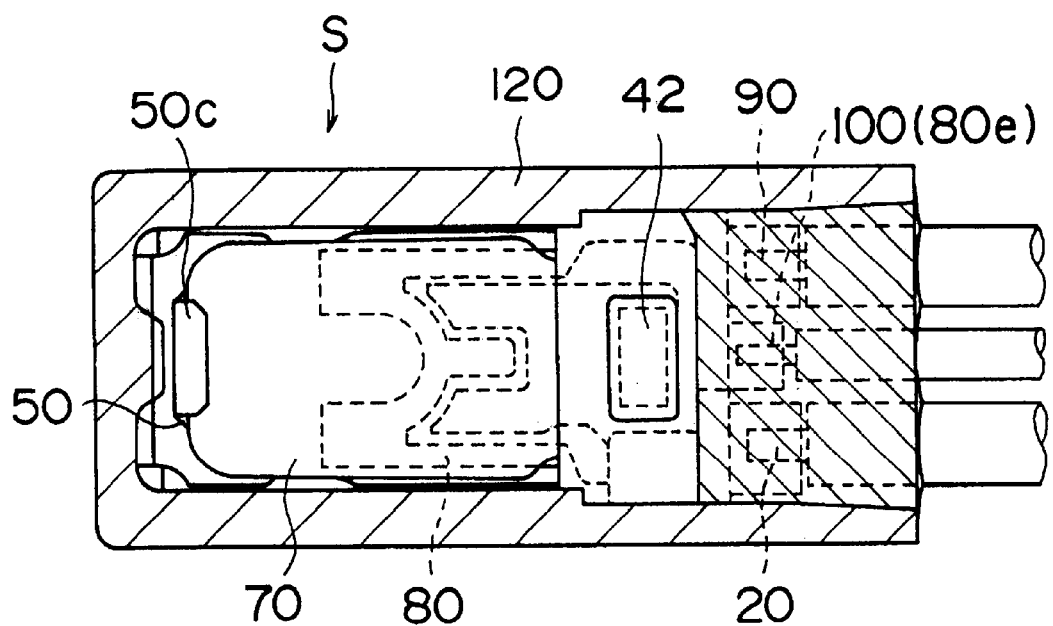
FIG. 3 is a sectional view showing another embodiment of a thermal shut-off device in accordance with the present invention.
Figure 4:
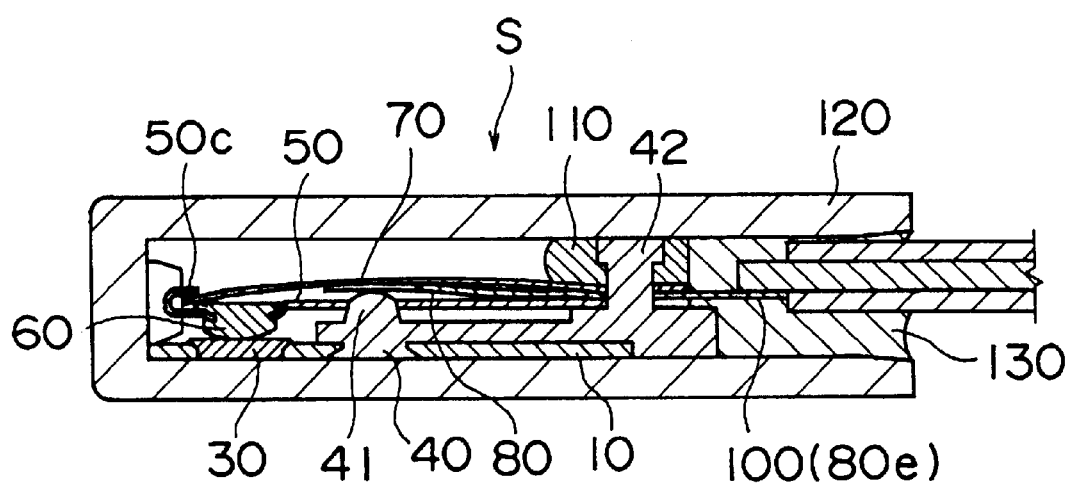
FIG. 4 is a longitudinal sectional view of the thermal shut-off device shown in FIG. 3.
Figure 5:
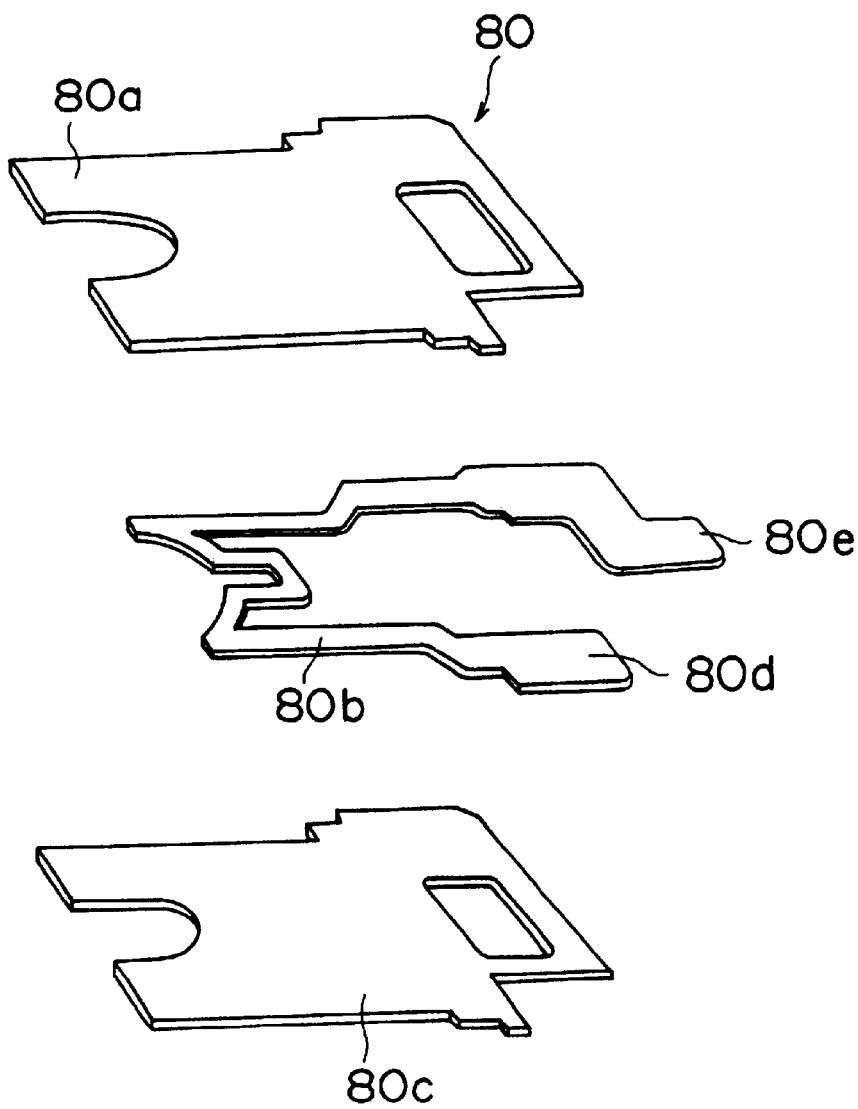
FIG. 5 is an exploded perspective view of a film-form resistor.

FIGS. 3, 4 and 5 show another embodiment of a thermal shut-off device in accordance with the present invention. In these figures, to the elements corresponding to the elements shown in FIGS. 1 and 2 are applied reference numerals that are formed by adding 0 to the reference numerals applied to the elements shown in FIGS. 1 and 2.

In this embodiment, a protrusion 41 is provided on an insulating plate 40 instead of the protrusion 5f provided on a movable plate 50 as shown in FIG. 2. Also, a bimetal 70 has a shape such that the rear end of the bimetal 7 shown in FIG. 2 is extended.

Between the movable plate 50 and the bimetal 70 is disposed a film-form resistor 80 shown in FIGS. 3 and 5. This film-form resistor 80 is constructed so that one face and the other face of a metallic foil (for example, a stainless steel foil with a thickness of 50 μm) 80b having a relatively high resistance are covered by flexible thin films (for example, polyimide resin) 80a and 80c having electrical insulation properties, respectively.

The right and left rear end portions 80d and 80e of the metallic foil 80b are exposed from the rear ends of the thin films 80a and 80c. The end portion 80d is fixed to the rear end portion of the movable plate 50 by means such as welding or fusing, and the end portion 80e is formed with a terminal 100 for connection to an external circuit.

The rear end portions of the movable plate 50, the bimetal 70, and the film-form resistor 80 are penetrated by a prismatic member 42 provided on the insulating plate 40, and are tightened together and fixed by an insulating member 110.

The film-form resistor 80 has a main heat generating region, which generates 50% or more of the calorific value, located on the outside of the fixed portion in this state. Specifically, the main heat generating region extends forward so as to be located in a space between the movable plate 50 and the bimetal 70, and the front end portion thereof is in contact with the lower face of the bimetal 70.

Since the resistor 80 is flexible, it does not hinder the reversing operation of the bimetal 70. Also, since the main heat generating region of the resistor 80 is formed by zigzagging the metallic foil 80b, the electrical resistance can be regulated by changing the thickness, width, and zigzag shape of the metallic foil 80b.

Figure 6:
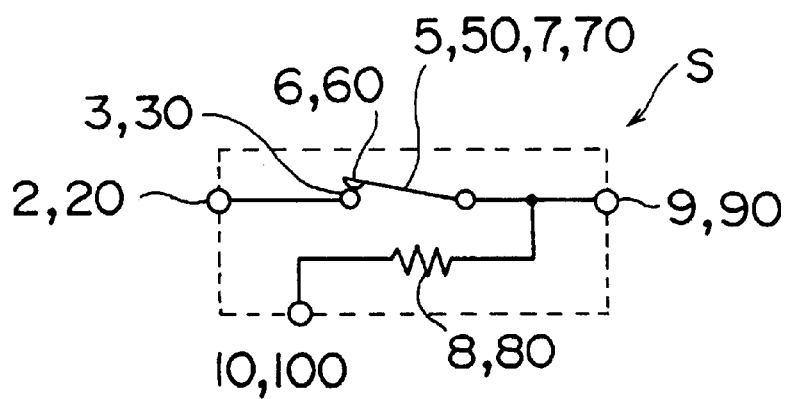
FIG. 6 is a circuit diagram for the thermal shut-off devices shown in FIGS. 1 and 3.

FIG. 6 is a circuit diagram for a thermal shut-off device S in accordance with the above-described embodiments. According to this thermal shut-off device S, when an abnormal load current flows between the terminals 2 (20) and 9 (90), the reversing operation of the bimetal 7 (70) caused by the heat generated in the movable plate 5 separates the movable contact 6 (60) from the fixed contact 3 (30). If the current for generating heat is supplied continuously, the open state of the contacts 6 (60) and 3 (30) is maintained.

In this thermal shut-off device S, the resistor 8 (80) is not connected in parallel to the bimetallic switch element. When the switch element becomes in an open state, therefore, the load current is completely interrupted. That is to say, this thermal shut-off device S provides a very good shut-off quality.

If what is called a PTC (Positive Temperature Coefficient) element such as a positive thermistor is used as the heat generating resistor 8 (80), the response of the thermal shut-off device can be improved. As is well known, the PCT element has a property that the electrical resistance rises suddenly as the temperature increases.

Figure 7:
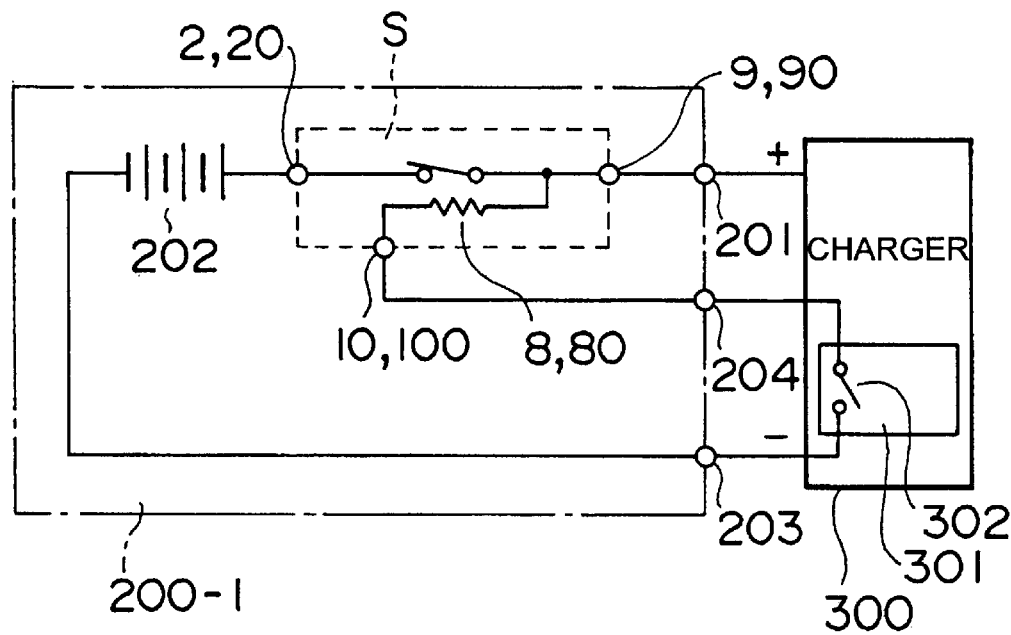
FIG. 7 is a circuit diagram showing one embodiment of a battery pack in accordance with the present invention.

FIG. 7 shows an embodiment of a battery pack in accordance with the present invention in which the above-described thermal shut-off device S is incorporated.

A battery pack 200-1 is configured so that the terminal 9 (90) of the thermal shut-off device S, the terminal 2 (20) thereof, and the terminal 10 (100) thereof are connected to a terminal 201 for external connection, a chargeable battery (for example, lithium battery) 202, and a terminal 204 for external connection, respectively.

The terminals 201 and 203 for external connection are connected to a positive output terminal and a negative output terminal of a charger 300, respectively. Also, the terminals 203 and 204 for external connection are connected to a normally-open switch element 302 (including a semiconductor switch element) in an abnormality detecting circuit 301 incorporated in the charger 300 or equipment such as a computer, not shown.

In this battery pack 200-1, if an abnormal charging current flows in the thermal shut-off device S, the abnormality detecting circuit 301 detects the abnormal charging current to close the switch element 302. Accordingly, a current flows in the resistor 8 (80) of the thermal shut-off device S so that the resistor generates heat, by which the thermal shut-off device S is opened. As a result, the charging current is interrupted.

After detecting the abnormal charging current, the abnormality detecting circuit 301 maintains the closed state of the switch element 302. During this time, the heat generating state of the heat generating element 80 is maintained by the current supplied from the charger 300.

When the battery pack 200-1 is removed from the charger 300, or when the power source of equipment such as a computer incorporating the charger 300 is turned off, no current flows in the resistor 8 (80), so that the temperature of the resistor 8 (80) lowers. When the temperature lowers to a predetermined value, the bimetal 7 (70) of the thermal shutoff device S performs a returning operation, becoming in a reusable state.

Although the operation in the case where an abnormal charging current (overcurrent) flows has been explained in the above description, the abnormality detecting circuit 301 also has a function of detecting an abnormal charging voltage (overvoltage) to close the switch element 302.

It is a matter of course that a temperature sensor such as a thermistor for detecting the temperature of the battery 202 can be included in the abnormality detecting circuit 301 so that the switch element 302 is closed when the temperature of the battery 202 becomes abnormal (excessive temperature).

Figure 8:
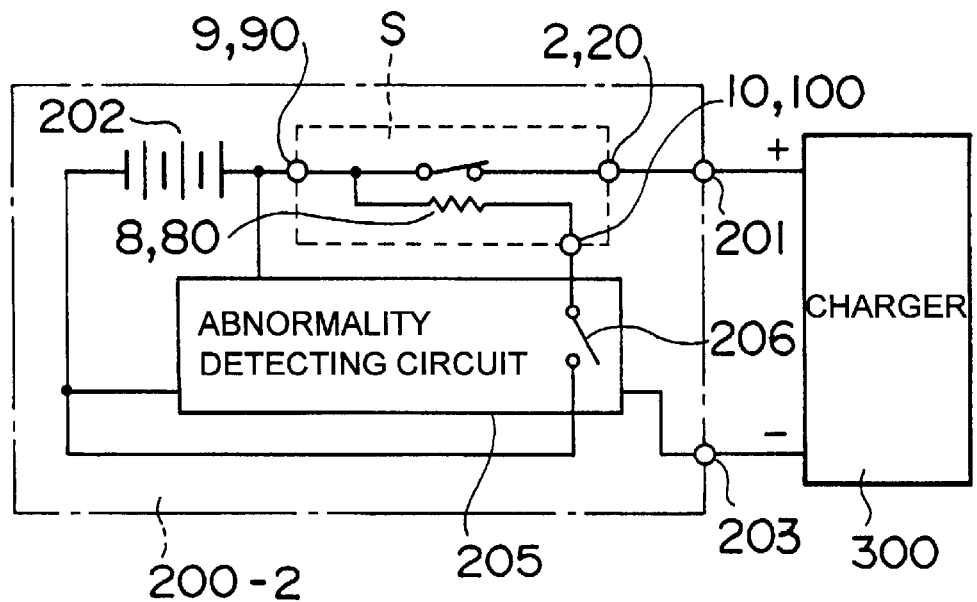
FIG. 8 is a circuit diagram showing another embodiment of a battery pack in accordance with the present invention.
Figure 9:
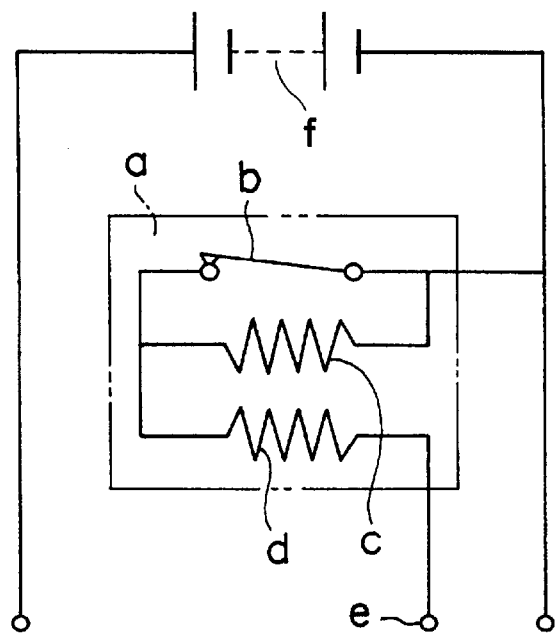
FIG. 9 is a circuit diagram showing a configuration of a conventional battery pack.
Figure 10:
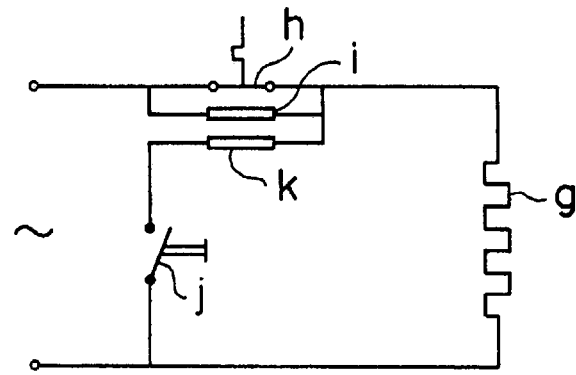
FIG. 10 is a circuit diagram showing one example of a conventional thermal shut-off device.
Figure 11:
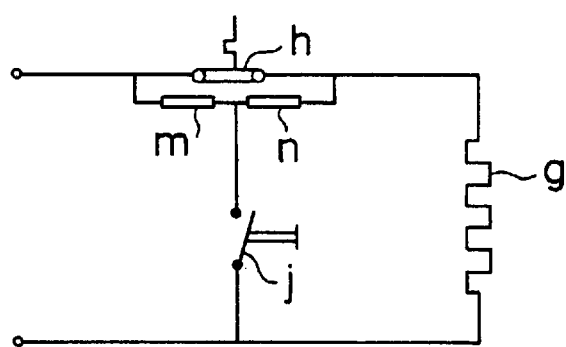
FIG. 11 is a circuit diagram showing another example of a conventional thermal shut-off device.

FIG. 8 shows another embodiment of a battery pack in accordance with the present invention in which the thermal shut-off device S is incorporated.

A battery pack 200-2 incorporates an abnormality detecting circuit 205 corresponding to the abnormality detecting circuit shown in FIG. 7. The terminal 2 (20) of the thermal shut-off device S is connected to a first terminal 201 for external connection, the terminal 9 (90) thereof is connected to a second terminal 203 for external connection via a battery 202 and the abnormality detecting circuit 205, and the terminal 10 (100) thereof is connected to a negative pole of the battery 202 via a normally-open switch element 206 of the abnormality detecting circuit 205.

In this battery pack 200-2, if an abnormal current flows in the thermal shut-off device S, the abnormality detecting circuit 205 detects the abnormal current to close the switch element 206. Accordingly, a current flows in the resistor 8 (80) of the thermal shut-off device S so that the resistor generates heat, by which the thermal shut-off device S is opened. As a result, the abnormal current is interrupted.

When the battery 202 is charged, the abnormality detecting circuit 205 detects an abnormal charging current as the aforementioned abnormal current. In this case, after detecting the abnormal charging current, the abnormality detecting circuit 205 maintains the closed state of the switch element 206. During this time, the resistor 8 (80) is supplied with a heat generating current from the battery 202. The heat generating current decreases with decreasing voltage of the battery 202 caused by the power consumption of the resistor 8 (80). When the heat generating current decreases to a predetermined value, the heat generating temperature of the resistor 8 (80) lowers, so that the thermal shut-off device S returns to the closed state.

On the other hand, when the battery 202 is discharged, the abnormality detecting circuit 205 detects an abnormal discharge current caused by overload, external short circuit, etc. as the aforementioned abnormal current. In this case as well, the abnormality detecting circuit 205 closes the switch element 206 and maintains the closed state, so that the abnormal current is interrupted.

The abnormality detecting circuit 205 also has a function of detecting an abnormal charging voltage of the battery 202 to close the switch element 302. As described above, a temperature sensor such as a thermistor for detecting the temperature of the battery 202 can be included in the abnormality detecting circuit 205 so that the switch element 206 is closed when the temperature of the battery 202 becomes abnormal.

What is claimed is:

1. A thermal shut-off comprising:
   a fixed plate having a first terminal and a first contact;
   a movable plate positioned above the fixed plate opposed to the first contact;
   a bimetal positioned on a side of an upper face of the movable plate and reversed to deform the movable plate such that the second contact is separated from the first contact, when a temperature exceeds a set temperature;
   a third terminal; and
   a film-shaped heat generating resistor disposed between the movable plate and the bimetal, whose one end is electrically connected to the movable plate and whose other end is electrically connected to the third terminal,
   wherein the bimetal is reversed by heat generation occurring when current is caused to flow in the heat generating resistor via the third terminal.

2. A thermal shut-off device according to claim 1, comprising: a battery pack accommodating a rechargeable battery and the thermal shut-off device; and
   charging means connected to the battery pack and charging the battery through the thermal shut-off device;
   wherein the charging means is provided with abnormality detecting means which detects abnormality of the battery to close a switch element, and a current is caused to flow from the charging means to the heat generating resistor of the thermal shut-off device through the switch element when the switch element of the abnormality detecting means is closed.

3. A charging system using the thermal shut-off device according to claim 1, comprising: a battery pack accommodating a rechargeable battery, the thermal shut-off device and abnormality detecting means detecting abnormality of the battery to close a switch element; and
   charging means connected to the battery pack and charging the battery through the thermal shut-off device,
   wherein the battery pack is structured so as to cause current to flow from the battery to the heat generating resistor of the thermal shut-off device through the switch element when the switch element of the abnormality detecting means is closed.

4. The battery pack according to claim 3, wherein the condition of said battery detected by said abnormality detecting means is the current of said battery.

5. The battery pack according to claim 3, wherein the condition of said battery detected by said abnormality detecting means is the voltage of said battery.

6. The battery pack according to claim 3, wherein the condition of said battery detected by said abnormality detecting means is the temperature of said battery.

7. A thermal shut-off device comprising:
   a fixed plate formed of a conductive material, the fixed plate having a terminal at the rear end portion thereof and a fixed contact at the front-end portion thereof;
   an insulating plate disposed on the first fixed plate, the insulating plate having two columnar protrusions at the rear part thereof; and
   a moveable plate, the moveable plate formed of a metal, the moveable plate having elasticity, the moveable plate disposed on the insulating plate by fitting the rear part thereof onto the columnar protrusions associated with the insulating plate, the moveable plate having a moveable contact opposed to the fixed contact on a front portion thereof and a terminal on the rear end portion thereof.

8. The thermal shut off device of claim 7, further comprising:
   a bi-metal element placed on an upper face of the moveable plate, the bi-metal element supported on the moveable plate by two or more claws disposed at both ends of the moveable plate, the bi-metal element being loosely fitted into the two or more claws.

9. The thermal shut-off device of claim 7, further comprising:
   a resistor fitted onto the columnar protrusions, the resistor disposed above the rear part of the moveable plate, wherein a terminal is fitted onto the columnar protrusions and disposed on the upper face of the resistor such that the first end of the resistor is electrically connected to the upper face of the rear part of the moveable plate and a second end of the resistor is electrically connected to the lower face of the terminal.

10. The thermal shut-off device of claim 9, further comprising:
    an insulating plate disposed on the upper face of the terminal, wherein the columnar protrusions are bonded to the upper face of the insulating plate.

11. The thermal shut-off device of claim 7, further including a housing, the housing enclosing the fixed plate, the insulating plate and the moveable plate, the housing being sealed.

12. A thermal shut-off device comprising:

a fixed plate formed of a conductive material with a terminal at a rear end portion thereof and a fixed contact at the front-end portion thereof;

an insulating plate disposed on the first fixed plate, the insulating plate having a protrusion disposed on a front portion thereof;

a moveable plate having a moveable contact disposed on a front portion thereof and a terminal disposed on a rear portion thereof, the moveable plate having an opening through which a protrusion associated with the insulating plate can pass.

13. The thermal shut-off device of claim 12, further comprising:

a bi-metal element placed on the upper face of the moveable plate, the moveable plate having a claw disposed on the front portion thereof, the bimetal element being fitted onto the claw and fixed at the rear portion thereof; and a film form resistor including a metallic foil covered by a flexible thin film having insulation properties is disposed between the moveable plate and the bi-metal element.

14. The battery pack according to claim 2, wherein the condition of said battery detected by said abnormality detecting means is the current of said battery.

15. The battery pack according to claim 2, wherein the condition of said battery detected by said abnormality detecting means is the voltage of said battery.

16. The battery pack according to claim 2, wherein the condition of said battery detected by said abnormality detecting means is the temperature of said battery.

* * * * *